(12) United States Patent
Senda et al.

(10) Patent No.: US 6,474,179 B1
(45) Date of Patent: Nov. 5, 2002

(54) TORQUE SENSOR

(75) Inventors: Shunya Senda, Tochigi (JP); Takayuki Ueno, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/502,358

(22) Filed: Feb. 14, 2000

(30) Foreign Application Priority Data

Feb. 15, 1999 (JP) .......................................... 11-035779

(51) Int. Cl.$^7$ ................................................. G01L 3/02
(52) U.S. Cl. ................................................. 73/862.331
(58) Field of Search ....................... 73/862.33, 862.331, 73/862.335, 862.28, 862.27

(56) References Cited

U.S. PATENT DOCUMENTS

| | | | | |
|---|---|---|---|---|
| 4,829,247 A | * | 5/1989 | Wallrafen ............... | 324/207.12 |
| 4,907,460 A | * | 3/1990 | Taniguchi et al. ....... | 73/862.33 |
| 4,918,418 A | * | 4/1990 | Tsala .......................... | 336/180 |
| 5,522,269 A | * | 6/1996 | Takeda et al. .............. | 324/209 |
| 5,796,014 A | * | 8/1998 | Chikaraishi et al. ... | 73/862.331 |

FOREIGN PATENT DOCUMENTS

JP       8136366       5/1996

* cited by examiner

*Primary Examiner*—Max Noori
(74) *Attorney, Agent, or Firm*—Orum & Roth

(57) ABSTRACT

The present invention provides a torque sensor comprising: a pair of coils having inductances changing mutually in a reverse direction in accordance with a torque; a first differential amplifier means inputting first and second sub-voltages based on each inductance change of the both coils, and amplifying a difference between the first and second sub-voltages so as to output it as a first main voltage; a second differential amplifier means inputting third and fourth sub-voltages based on each inductance change of the both coils, and amplifying a difference between the third and fourth sub-voltages so as to output it as a second main voltage; and an abnormal state signal outputting means outputting an abnormal state signal when a difference between the first and second main voltages exceeds a predetermined allowable range, the torque sensor further including: an abnormal state comparator means for judging an abnormal state of the coils from the first, second, third and fourth sub-voltages; and a voltage displacement means for displacing the second main voltage so as to exceed the predetermined allowable range when the abnormal state comparator means makes a decision that an abnormal state occurs, the abnormal state signal outputting means outputting the abnormal state signal when an abnormal state occurs in the coils.

4 Claims, 5 Drawing Sheets

TORQUE SENSOR

BACKGROUND OF THE INVENTION

1. Field of the Invention

The present invention relates to a torque sensor which detects a torque on the basis of an inductance change of a pair of coils, and in particular, to a torque sensor which can detect an abnormal state such as a connective fault of a coil.

2. Description of the Related Art

Relating to this type of torque sensor detecting a connective fault of a coil, there is a torque sensor disclosed in Japanese Patent Application Laid-Open No. 8-136366.

The torque sensor disclosed in the above publication includes a pair of coils whose inductance mutually changes in a reverse direction in accordance with a torque, and a differential amplifier circuit which differentially amplifies a pair of detection voltages induced to the pair of coils when receiving the detection voltages, and thus, detects a torque from an output of the differential amplifier circuit.

Then, when detecting an abnormal state from the detection voltage induced to the pair of coils, the torque sensor controls the differential amplifier circuit so that an output of the differential amplifier circuit becomes a predetermined value other than a steady-state output range.

When the output of the differential amplifier circuit becomes the above predetermined value, the torque sensor makes a decision that an abnormal state such as a connective fault of a coil takes place.

For this reason, the following comparator means must be independently provided; more specifically, the comparator means makes a decision whether or not the output of the differential amplifier circuit is other than a steady-state output range.

SUMMARY OF THE INVENTION

The present invention has been achieved with a view of the aforesaid problem in the prior art. It is, therefore, an object of the present invention to provide a torque sensor which can detect an abnormal state such as a connective fault of coil from an output of a differential amplifier circuit without newly providing a comparator means independently from the torque sensor.

To achieve the above object, the present invention provides a torque sensor comprising: a pair of coils having inductances changing mutually in a reverse direction in accordance with a torque; a first differential amplifier means inputting first and second sub-voltages based on each inductance change of the both coils, and amplifying a difference between the first and second sub-voltages so as to output it as a first main voltage; a second differential amplifier means inputting third and fourth sub-voltages based on each inductance change of the both coils, and amplifying a difference between the third and fourth sub-voltages so as to output it as a second main voltage; and an abnormal state signal outputting means outputting an abnormal state signal when a difference between the first and second main voltages exceeds a predetermined allowable range, the torque sensor further including: an abnormal state comparator means for judging an abnormal state of the coils from the first, second, third and fourth sub-voltages; and a voltage displacement means for displacing the second main voltage so as to exceed the predetermined allowable range when the abnormal state comparator means makes a decision that an abnormal state occurs, the abnormal state signal outputting means outputting the abnormal state signal when an abnormal state occurs in the coils.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

One embodiment of the present invention will be described below with reference to FIG. 1 to FIG. 5.

Figure 1:
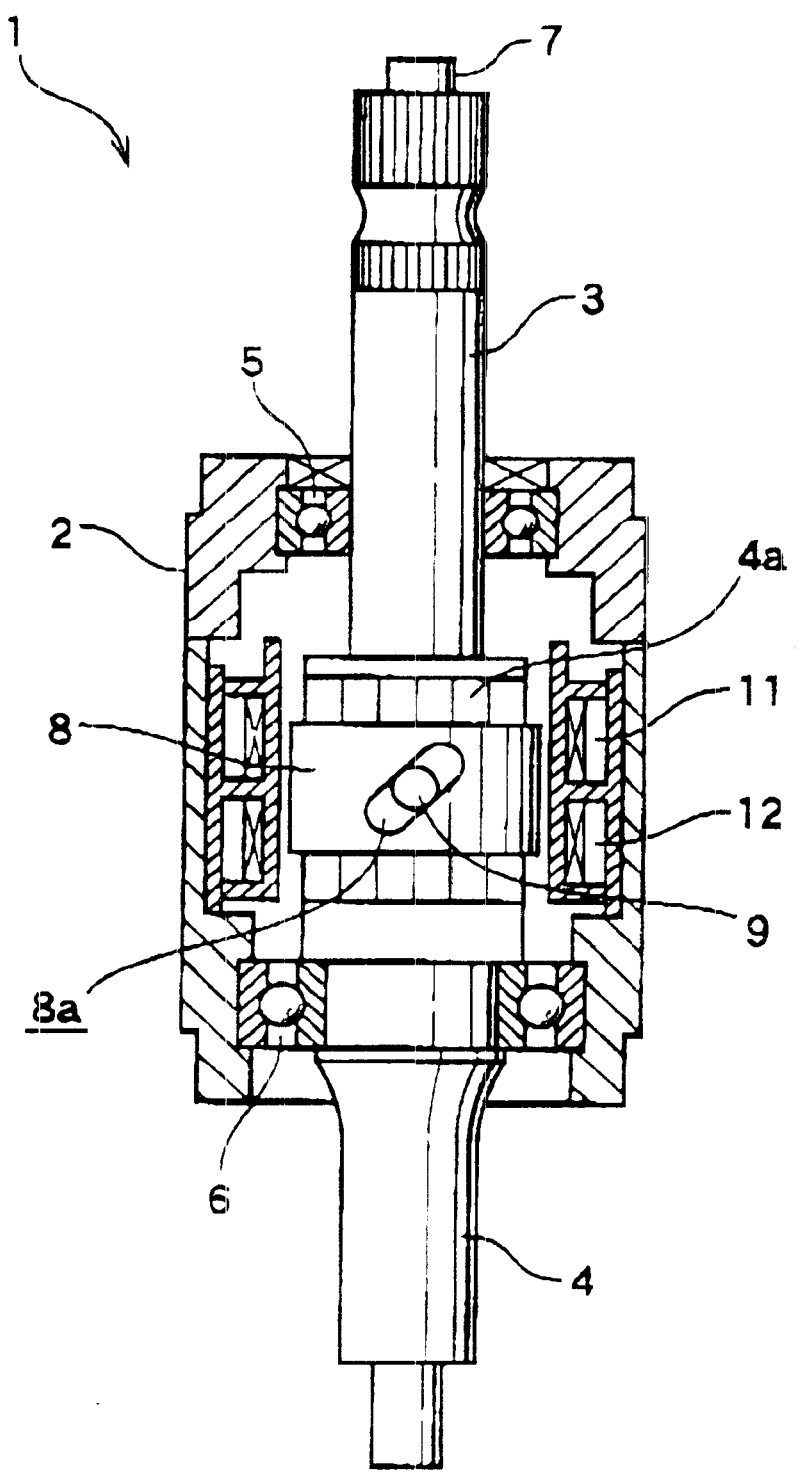
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, and coaxially inserted into a housing 2, and are connected by a torsion bar 7 therein.

A cylindrical core 5 is fitted onto a serrated outer peripheral surface of a large-diameter end portion 4a of the output shaft 4, and is provided so as to be slidable in only an axial direction with respect to the output shaft 4. A slider pin 9 projected from the output shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidable along an axial direction via a space.

These two coils 11 and 12 are arranged at a side opposite to each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed; as a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increases, a magnetic loss increases; therefore, an inductance of the coil decreases. Conversely, when the area surrounding the core 8 decreases, a magnetic loss decreases; therefore, an inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance L2 of the coil 12 decreases.

Figure 2:
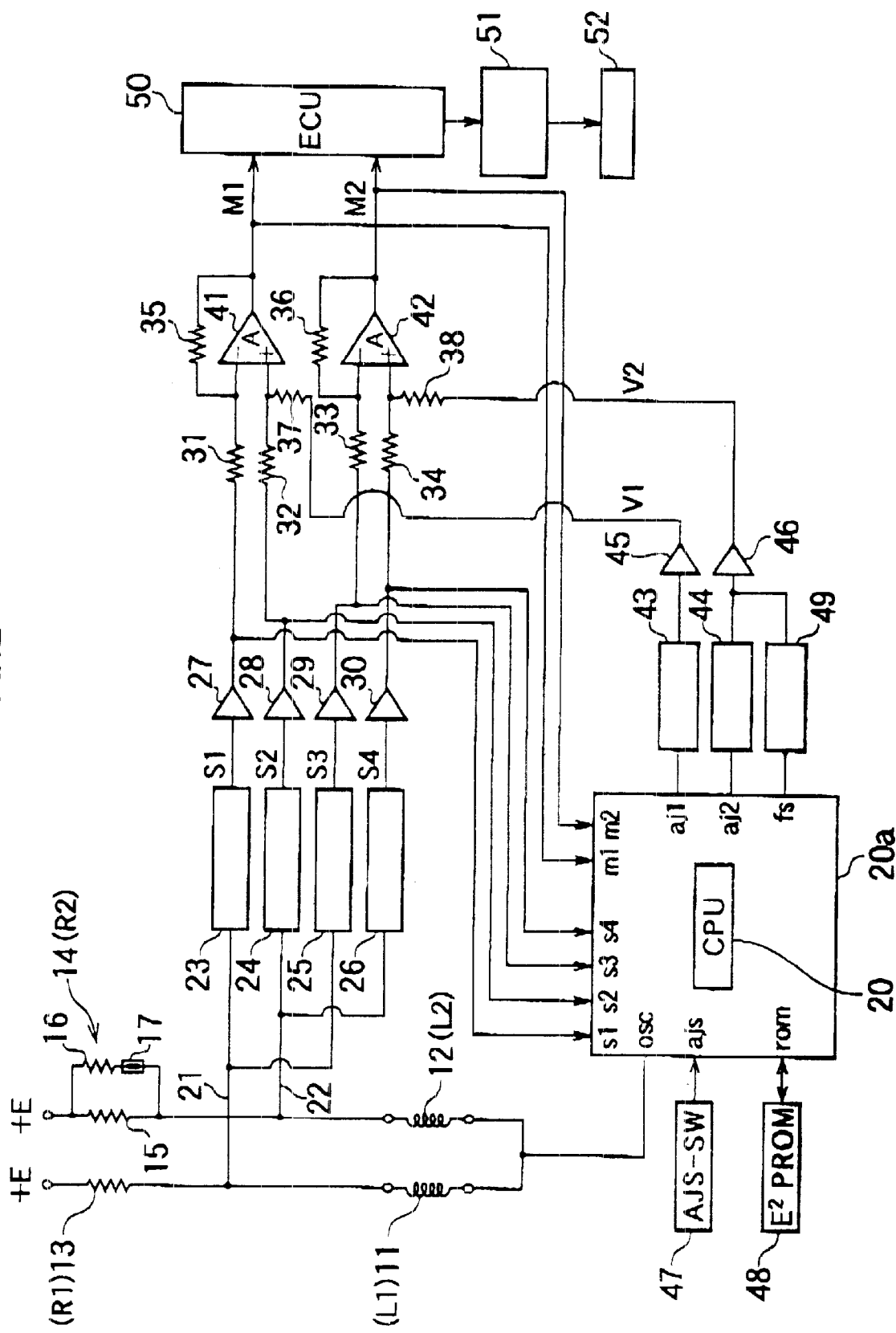
FIG. 2 is a block diagram schematically showing electrical circuit elements of the torque sensor

FIG. 2 is a block diagram schematically showing a construction of electric circuit parts of the torque sensor 1 which detects a torque on the basis of a change of the inductances L1 and L2 of the coils 11 and 12.

The coils 11 and 12 are suspended from a positive voltage E via a resistor 13 (R1) and a resistor circuit 14 (R2), respectively. The other terminal of respective coils 11 and 12 is connected to an oscillating output terminal osc of a control board 20a which is mounted with a CPU 20.

The resistor circuit 14 has a construction in which a resistor 15 is connected in parallel to a resistor 16 and a thermister 17 connected in series, and performs as a temperature compensating function by an effect of the thermister 17.

More specifically, the thermister 17 has a temperature characteristic of showing a resistance value R2 always satisfying a relation R1/L1=R2/L2 regardless of a temperature change.

A voltage signal line 21 extends from a connective portion of the coil 11 and the resistor 13, and diverges so as to be connected to each of rectifier/smoothing circuits 23 and 25. On the other hand, a voltage signal line 22 extends from a connective portion of the coil 12 and the resistor circuit 14, and diverges so as to be connected to each of rectifier/smoothing circuits 24 and 26.

In other words, these coils 11 and 12, the resistor 13 and the resistor circuit 14 constitute a bridge circuit, and when an oscillation voltage is inputted to the bridge circuit, an output voltage of the bridge circuit is inputted to the rectifier/smoothing circuits 23, 24, 25 and 26.

The output voltage of the bridge circuit is rectified and smoothened by each of the rectifier/smoothing circuits 23, 24, 25 and 26 so as to be inputted to buffer circuits 27, 28, 29 and 30 as first, second, third and fourth sub-voltages S1, S2, S3 and S4.

Output terminals of the buffer circuits 27 and 28 are connected individually to an inverted input terminal and a non-inverting input terminal of a differential amplifier 41 via resistors 31 and 32.

Likewise, output terminals of the buffer circuits 29 and 30 are connected individually to an inverted input terminal and a non-inverting input terminal of a differential amplifier 42 via resistors 33 and 34.

A negative feedback is applied to the differential amplifiers 41 and 42 by resistors 35 and 36 so as to function as a differential amplifier, and then, outputs of these differential amplifiers 41 and 42 are inputted to an electronic control unit ECU 50 as a first main voltage M1 and a second main voltage M2.

Neutral point adjusting voltages V1 and V2 are individually inputted to each non-inverting input terminal of the differential amplifiers 41 and 42 from neutral point voltage setting circuits 43 and 44 via buffer circuits 45 and 46 and resistors 37 and 38.

The neutral point voltage setting circuits 43 and 44 inputs each adjusting signal from neutral point adjusting output terminals sj1 and sj2 of the control board 20a, and then, set neutral point voltages V1 and V2 according to the adjusting signal.

The differential amplifier 41 multiplies a difference between the first sub-voltage S1 and the second sub-voltage S2 by A, and then, outputs a voltage to which adding the neutral point adjusting voltage V1 as a bias voltage, as a first main voltage M1.

Namely, the first main voltage M1 is obtained from the following equation.

$$M1 = (S2 - S1) \cdot A + V1$$

Likewise, a second main voltage M2 outputted by the differential amplifier 42 is obtained from the following equation.

$$M2 = (S4 - S3) \cdot A + V2$$

In this case, a neutral main voltage, which is biased to neither a right steering torque (torsional torque of right direction) nor a left steering torque (torsional torque of left direction), is called as a neutral point voltage, and the aforesaid neutral point adjusting voltages V1 and V2 are equivalent to the neutral point voltage.

The ECU 50 outputs a motor control signal to a motor driver 51 on the basis of the first main voltage M1, and then, a motor 52 assisting steering is driven by the motor driver 51.

On the other hand, the second main voltage M2 is used for detecting an abnormal state, and the ECU 50 makes a decision whether or not a difference between the first main voltage M1 and the second main voltage M2 is within a predetermined allowable range. In the case where the difference exceeds the allowable range, the ECU 50 makes a decision that the torque sensor 1 is in an abnormal state, and then, outputs an abnormal state signal so as to control or stop the motor 52.

Moreover, when the first, second, third and fourth sub-voltages S1, S2, S3 and S4 and the first and second main voltage M1 and M2 are inputted to the control board 20a, the control board 20a discriminates an abnormal state of coils 11 and 12 on the basis of these first, second, third and fourth sub-voltages S1, S2, S3 and S4. When detecting the abnormal state, the control board 20a outputs an abnormal state detection signal to an abnormal state voltage setting circuit 49 from an abnormal state output terminal fs.

The abnormal state voltage setting circuit 49 is connected to an input terminal of the buffer circuit 46 on a voltage line connected to the non-inverting input terminal of the differential amplifier 42. When inputting the abnormal state detection signal, the abnormal state voltage setting circuit 49 changes the neutral point adjusting voltage V2, which is a bias voltage, to an abnormal state voltage so as to displace the second main voltage M2.

In this case, the abnormal state voltage setting circuit 49 displaces the second main voltage M2 within a steady-state voltage range.

Moreover, in the control board 20a, a neutral point adjusting signal AJS for adjusting a neutral point is inputted to a neutral point adjusting terminal ajs from a neutral point adjusting switch AJS-SW 47. An E$^2$PROM 48, which is capable of storing and rewriting the neutral point voltage setting state, is connected to a neutral point voltage setting terminal rom.

Figure 3:
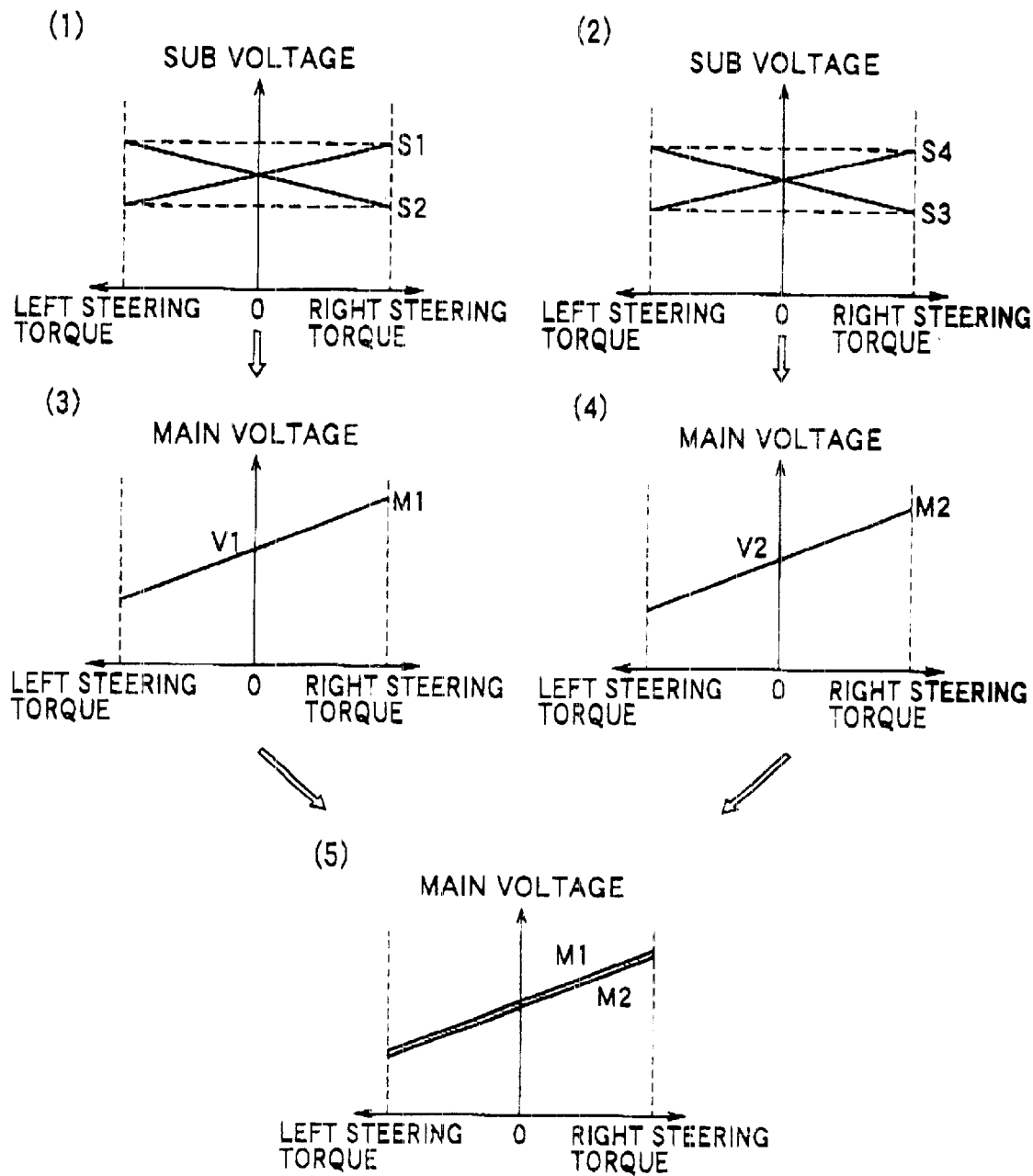
FIG. 3 is a view showing each state of first, second, third and fourth sub-voltages and first and second main voltages in a normal state.
Figure 4:
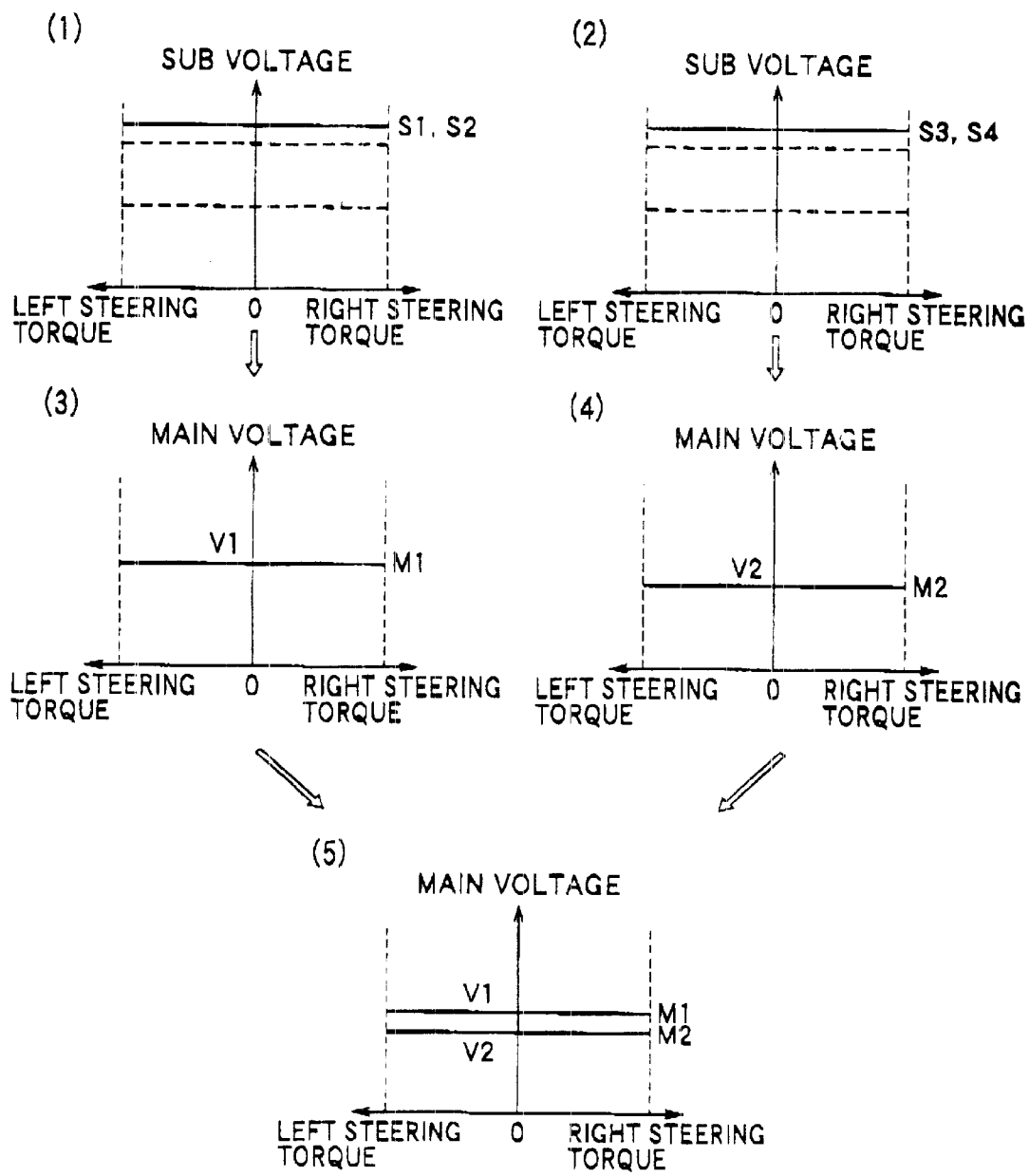
FIG. 4 is a view showing each state of first, second, third and fourth sub-voltages and first and second main voltages in an abnormal state.
Figure 5:
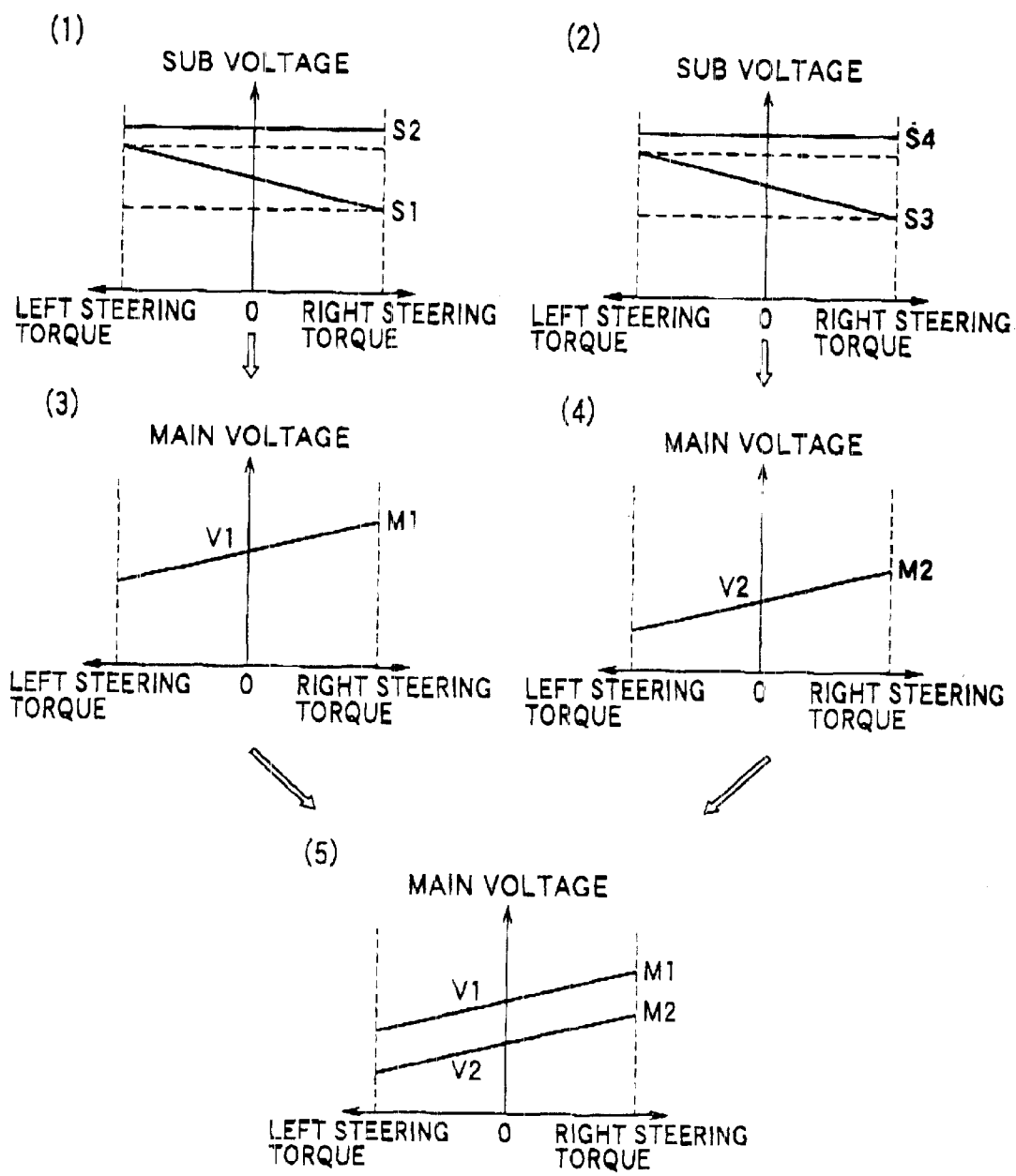
FIG. 5 is a view showing each state of first, second, third and fourth sub-voltages and first and second main voltages in another abnormal state.

The torque sensor of this embodiment has a circuit construction as described above, and an operation of the torque sensor will be described below with reference to FIG. 3 to FIG. 5 showing each state of first, second, third and fourth sub-voltages S1, S2, S3 and S4 and first and second main voltages M1 and M2.

Each coordinate shown in FIG. 3 to FIG. 5 has a vertical axis showing a voltage, the right direction of a horizontal axis showing a right steering torque, and the left direction of a horizontal axis showing a left steering torque. The origin O is the neutral point.

FIG. 3 shows a state and condition in which the torque sensor 1 is normally operated. When a right steering torque increases, the core 8 is moved to the coil 11 side by a relative rotation of the input shaft 3 and the output shaft 4, and the inductance L2 of the coil 12 is increased so that an induced electromotive force of the coil L2 is increased; conversely, the inductance L1 of the coil 11 is decreased so that an induced electromotive force of the coil 11 is reduced. Therefore, the second and fourth sub-voltages S2 and S4 increase; on the other hand, the first and third sub-voltages S1 and S3 decrease (see FIG. 3(1) and FIG. 3(2)).

Moreover, in the case where a left steering torque increases, conversely to the above case, the second and fourth sub-voltages S2 and S4 decrease; on the other hand, the first and third sub-voltages S1 and S3 increase (see FIG. 3(1) and FIG. 3(2)).

Thus, a difference between the above two sub-voltages is multiplied by A, and then, the neutral point voltage is added to the first and second main voltages M1 and M2 which are the outputs of the differential amplifiers 41 and 42. Accordingly, the first and second main voltages M1 and M2 become inclined lines upward to the right passing through V1 and V2 at the neutral point, as shown in FIG. 3(3) and FIG. 3(4), respectively.

Then, the ECU 50 compares the first and second main voltages M1 and M2, and makes a decision whether or not the difference between these main voltages is within the allowable range.

When the difference is a normal, as shown in FIG. 3(5), the change of the first and second main voltages M1 and M2 is approximately coincident; therefore, a decision is made that the difference is within the allowable range.

When a decision is made that the torque sensor is normal, the ECU outputs an instructive signal for driving the motor 52 to the motor driver 51 on the basis of the first main voltage M1.

In the aforesaid manner, an auxiliary power by the motor acts onto steering in accordance with a steering torque, and thus, power steering is performed.

In the case where these coils 11 and 12 are not securely mounted and are both in a connective fault state, both coils 11 and 12 are is a disconnection state, and as shown in FIG. 4(1) and FIG. 4(2), the first to fourth sub-voltages S1, S2, S3 and S4 are fixed to a predetermined high voltage value.

The CPU 20 makes a decision that an abnormal state occurs, on the basis of each state of these sub-voltages, and then, outputs an abnormal state detection signal from the abnormal state output terminal fs to the abnormal state voltage setting circuit 49.

The first main voltage M1 is fixed to the neutral point voltage V1 (see FIG. (3)); however, the neutral point voltage V2 inputted to the non-inverting input terminal of the differential amplifier 42 is set to an abnormal state voltage by the abnormal state voltage setting circuit 49, and then, is displaced beyond the allowable range, and thus, as shown in FIG. 4(4) and FIG. 4(5), the second main voltage M2 is fixed to a voltage V2 properly lower than the first main voltage M1.

By applying the allowable range for judging a slight difference between the first and second main voltages M1 and M2 which should be coincident in a normal state, the difference between the first and second main voltages M1 and M2 exceeds the allowable range.

Therefore, the ECU 50 can make a decision that an abnormal state occurs, on the basis of the aforesaid allowable range, and can output an abnormal state signal for stopping a drive of the motor 52.

Moreover, in the case where one of the coil 11 or coil 12 is in a connective fault state, or is disconnected, for example, when the coil 12 is disconnected, as shown in FIG. 5(1) and FIG. 5(2), the first and third sub-voltages S1 and S3 show a normal value; however, the second and fourth sub-voltages S2 and S2 are set to a predetermined high voltage.

As shown in FIG. 5(3), the first main voltage M1 shows a straight line passing through the neutral point voltage V1 and having an inclination gentler than a normal state. On the other hand, the second main voltage M2 exceeds the allowable range and is displaced as shown in FIG. 5(4) because the abnormal state signal is outputted from the CPU 20, and shows a voltage properly lower than the first main voltage M1.

Therefore, the difference between the first and second main voltages M1 and M2 exceeds the allowable range (see FIG. 5(5)), and the ECU 50 makes a decision that an abnormal state occurs, and then, outputs an abnormal state signal for controlling, such as stopping a drive of the motor 52.

As is evident from the above description, in the torque sensor 1 of the present invention, by making use of the allowable range already included in the ECU 50 for judging an abnormal state, it is possible to discriminate the abnormal state such as connective fault of coils 11 and 12 on the basis of the first and second main voltages M1 and M2, and therefore, no new judging means is required independently from the torque sensor.

As heretofore explained, embodiments of the present invention have been described in detail with reference to the drawings. However, the specific configurations of the present invention are not limited to the embodiments but those having a modification of the design within the range of the present invention are also included in the present invention.

As heretofore mentioned, the device according to the present invention provides a torque sensor comprising: a pair of coils having inductances changing mutually in a reverse direction in accordance with a torque; a first differential amplifier means inputting first and second sub-voltages based on each inductance change of the both coils, and amplifying a difference between the first and second sub-voltages so as to output it as a first main voltage; a second differential amplifier means inputting third and fourth sub-voltages based on each inductance change of the both coils, and amplifying a difference between the third and fourth sub-voltages so as to output it as a second main voltage; and an abnormal state signal outputting means outputting an abnormal state signal when a difference between the first and second main voltages exceeds a predetermined allowable range. The torque sensor further includes: an abnormal state judging means for judging an abnormal state of the coils from the first, second, third and fourth sub-voltages; and a voltage displacement means for displacing the second main voltage so as to exceed the predetermined allowable range when the abnormal state judging means makes a decision that an abnormal state occurs, the abnormal state signal outputting means outputting the abnormal state signal when an abnormal state occurs in the coils.

Thus, when the abnormal state such as a connective fault occurs in the coils, the abnormal state judging means makes a decision that an abnormal state occurs from the first, second, third and fourth sub-voltages, and then, the voltage displacement means displaces the second main voltage so as to exceed the predetermined allowable range. Accordingly, the abnormal state signal outputting means makes a judgment on the basis of the difference between the displaced second main voltage and the first main voltage and a reference of the predetermined allowable range, and then, outputs the abnormal state signal.

Moreover, without newly providing the comparator means independently, it is possible to judge an abnormal state such as a connective fault of the coils by the abnormal state outputting means on the basis of the output from the differential amplifier circuit.

Further, the present invention provides the torque sensor wherein the abnormal state judging means makes a decision that an abnormal state occurs when at least one of the first, second, third and fourth sub-voltages exceeds a predetermined range.

Thus, when the connective fault occurs in the coils, the sub-voltage shows a constant voltage other than a predetermined range. Therefore, it can be judged that the connective fault occurs in the coils when at least one of the first, second, third and fourth sub-voltages exceeds a predetermined range.

Further, the present invention provides the torque sensor wherein the second differential amplifier means is a differential amplifier to which a negative feedback is applied, and the voltage displacement means displaces the second main voltage by applying a predetermined voltage to a non-inverting input terminal of the differential amplifier.

Thus, a voltage applied to the non-inverting input terminal of the differential amplifier is set as a bias voltage of the output (second main voltage) of the differential amplifier, and then, it is possible to displace the second main voltage within a steady-state voltage range by the applied voltage.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A torque sensor comprising:
   a pair of coils having inductances changing mutually in a reverse direction in accordance with a torque;
   a first differential amplifier means inputting first and second sub-voltages based on each inductance change of the coils, and amplifying a difference between the first and second sub-voltages so as to output the difference as a first main voltage;
   a second differential amplifier means inputting third and fourth sub-voltages based on each inductance change of the coils, and amplifying a second difference between the third and fourth sub-voltages so as to output the second difference as a second main voltage; and
   an abnormal state signal outputting means outputting an abnormal state signal when a third difference between the first and second main voltages exceeds a predetermined allowable range,
   the torque sensor further including:
   an abnormal state comparator means for judging an abnormal state of the coils from the first, second, third and fourth sub-voltages; and
   a voltage displacement means for displacing the second main voltage so as to exceed the predetermined allowable range when the abnormal state comparator means makes a decision that an abnormal state occurs,
   the abnormal state signal outputting means outputting the abnormal state signal when an abnormal state occurs in the coils.

2. The torque sensor according to claim 1, wherein the abnormal state comparator means makes a decision that an abnormal state occurs when at least one of the first, second, third and fourth sub-voltages exceeds a predetermined range.

3. The torque sensor according to claim 1, wherein the second differential amplifier means is a differential amplifier to which a negative feedback is applied, and the voltage displacement means displaces the second main voltage by applying a predetermined voltage to a non-inverting input terminal of the differential amplifier.

4. The torque sensor according to claim 2, wherein the second differential amplifier means is a differential amplifier to which a negative feedback is applied, and the voltage displacement means displaces the second main voltage by applying a predetermined voltage to a non-inverting input terminal of the differential amplifier.

* * * * *